US012669139B2

(12) United States Patent
Stanislaw et al.

(10) Patent No.: US 12,669,139 B2
(45) Date of Patent: Jun. 30, 2026

(54) HYDRAULIC TOOLS, SYSTEMS FOR TOOLS, AND METHODS OF USE OR CONTROL OF SAME

(71) Applicant: Huskie Tools, LLC, Addison, IL (US)

(72) Inventors: David Charles Stanislaw, Addison, IL (US); Michael C. Garrett, Addison, IL (US)

(73) Assignee: Huskie Tools, LLC, Addison, IL (US)

( * ) Notice: Subject to any disclaimer, the term of this patent is extended or adjusted under 35 U.S.C. 154(b) by 0 days.

(21) Appl. No.: 18/860,563

(22) PCT Filed: Apr. 28, 2023

(86) PCT No.: PCT/US2023/066390
§ 371 (c)(1),
(2) Date: Oct. 25, 2024

(87) PCT Pub. No.: WO2023/212716
PCT Pub. Date: Nov. 2, 2023

(65) Prior Publication Data

US 2025/0327469 A1 Oct. 23, 2025

Related U.S. Application Data

(60) Provisional application No. 63/336,241, filed on Apr. 28, 2022.

(51) Int. Cl.
*F15B 21/00* (2006.01)
*B25F 5/00* (2006.01)
(Continued)

(52) U.S. Cl.
CPC .............. *F15B 21/08* (2013.01); *B25F 5/005* (2013.01); *F15B 13/044* (2013.01); *F15B 15/18* (2013.01);
(Continued)

(58) Field of Classification Search
CPC .... B25F 5/005; B25F 5/02; B25F 5/00; B25B 27/10; B25B 27/146; B25B 28/00;
(Continued)

(56) References Cited

U.S. PATENT DOCUMENTS

| | | | | |
|---|---|---|---|---|
| 2016/0329674 | A1 | 11/2016 | Ballard et al. | |
| 2020/0198116 | A1 | 6/2020 | Skrobot | |
| 2021/0245227 | A1 * | 8/2021 | Skinner .................. | B25B 28/00 |

OTHER PUBLICATIONS

International Preliminary Report on Patentability (IPRP) for PCT/US2023/066390 mailed on Nov. 7, 2024 (8 pages).
(Continued)

*Primary Examiner* — Jacob A Smith
(74) *Attorney, Agent, or Firm* — Shumaker, Loop & Kendrick, LLP; S. Alexander Long, Jr.; Lloyd J. Wilson

(57) ABSTRACT

A hydraulic tool that executes a sequence of operations includes: a motor; a pump; hydraulic fluid driven by the pump; a chamber in fluid communication with the hydraulic fluid; a ram movably positioned at least partially in the chamber according to the hydraulic fluid and pressure thereof; a primary trigger configured to cause, upon actuation thereof, activation of the motor thereby causing: the pump to move hydraulic fluid from the reservoir into the ram chamber, extending the ram; a control system; and at least one sensor in communication the control system. When the primary trigger is user actuated and the ram is fully extended or the tool is clamped around a work piece, the pump continues to pump fluid, under at least partial control by the control system, until a threshold condition is determined by the at least one control system using the at least one sensor.

21 Claims, 10 Drawing Sheets

(51) Int. Cl.
*F15B 13/044* (2006.01)
*F15B 15/18* (2006.01)
*F15B 21/08* (2006.01)

(52) U.S. Cl.
CPC . *F15B 2211/6306* (2013.01); *F15B 2211/853* (2013.01); *F15B 2211/857* (2013.01)

(58) Field of Classification Search
CPC ........ F15B 21/08; F15B 13/044; F15B 15/18; F15B 2211/6306; F15B 2211/853; F15B 2211/857
USPC ........................ 173/217, 168, 19, 32, 1, 216
See application file for complete search history.

(56) References Cited

OTHER PUBLICATIONS

International Search Report (ISR) for PCT/US2023/066390 mailed on Nov. 29, 2023 (4 pages).
Written Opinion (WO) for PCT/US2023/066390 mailed on Nov. 29, 2023 (6 pages).

* cited by examiner

HYDRAULIC TOOLS, SYSTEMS FOR TOOLS, AND METHODS OF USE OR CONTROL OF SAME

CROSS-REFERENCE TO RELATED APPLICATION

This application is a United States 371 National Stage Entry Application claiming the benefit of priority of Patent Cooperation Treaty (PCT) Application No. PCT/US2023/066390, filed Apr. 28, 2023, entitled "HYDRAULIC TOOLS, SYSTEMS FOR TOOLS, AND METHODS OF USE OR CONTROL OF SAME", which is incorporated herein in its entirety, and claims the benefit of priority of U.S. provisional patent application No. 63/336,241, titled "HYDRAULIC TOOLS, SYSTEMS FOR TOOLS, AND METHODS OF USE OR CONTROL OF SAME," filed on Apr. 28, 2022, the entire contents of each of which are expressly incorporated herein by reference.

TECHNICAL FIELD

The present disclosure relates to powered tools. More particularly, the present disclosure relates to powered hydraulic tools, for example used by utility line workers.

BACKGROUND

Some job-specific tools are intended for safe and reliable use in demanding situations such as those following damaging natural events including storms, tornadoes, hurricanes, and just fallen trees and other less severe occurrences. Powered hydraulic tools are used, for example, for cable cutting, and compression (or crimping) of connectors in the electrical industry, particularly by utility linemen and professional electricians to cut electrically conductive cables and install connectors. Such job-specific tools for use in the field, for example in lift buckets, tend to be lighter weight and ergonomic compared to cutting and compression tools for shop use.

Handheld cutting and compression tools are used by utility linemen and professional electricians. Manual or battery powered tools use hydraulic and/or mechanical means to produce cutting or crimping forces sufficient to cut cable or deform connectors. High forces are required to assure a task upon a work piece like a segment of power-transmission cable can be achieved. Workers in this field are subject to dark, wet, and changing conditions, often far off the ground. Tool reliability and worker safety are primary needs. A jammed tool, or a tool locked and dysfunctional on a work piece, slows progress and leaves workers exposed unnecessarily.

Smarter tools that react to and/or utilize real time variables, including variables other and/or in addition to pressure, are needed.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

In at least one embodiment, a hydraulic tool is configured to execute a sequence of operations. The tool comprising: an electric motor; a pump coupled to the motor; hydraulic fluid driven by the pump upon activation thereof; a reservoir for the hydraulic fluid, the reservoir in fluid communication with the pump; a chamber in fluid communication with the hydraulic fluid upon activation of the pump; a ram movably positioned at least partially in the chamber according to the hydraulic fluid and pressure thereof; a primary trigger configured to cause, upon actuation thereof, activation of the motor thereby causing: the pump to move hydraulic fluid from the reservoir into the chamber thereby extending the ram; a control system; and at least one sensor in communication the control system. When the primary trigger is user actuated and the ram is fully extended or the tool is clamped around a work piece, the pump continues to pump fluid, under at least partial control by the control system, until a threshold condition is determined by the control system using the at least one sensor.

In some examples, the control system is configured to override user action on the primary trigger in the event of the threshold condition being determined by the control system.

The sensor may include at least one of a pressure transducer and a switch.

Some embodiments include a pressure transducer that sends a signal to the control system indicating a certain pressure has been reached, which, in combination with at least one other variable, then causes the control system to turn off the electric motor.

In some embodiments, a solenoid actuated valve is in fluid communication with the chamber. The solenoid actuated valve opens upon being activated, and the chamber decompresses as the hydraulic fluid flows from the chamber to the reservoir.

A return spring may be coupled to the ram, the return spring acting to retract the ram thereby forcing the reservoir fluid through the open solenoid actuated valve back to reservoir.

The solenoid actuated valve may close upon being deactivated, and once a low-pressure signal is reached, a signal may be sent to deactivate the solenoid actuated valve.

The hydraulic tool may further include a secondary trigger by which the solenoid valve is activated to open, which vents the fluid in the ram chamber back to reservoir such that the ram retracts.

The secondary trigger may include a depressible electronic release, and when the primary trigger is released before the ram is fully extended, the ram will stop and hold position.

The hydraulic tool may further include a manual release trigger by which manually opens a return valve, thereby venting the hydraulic fluid in the chamber back to the reservoir such that the ram retracts.

In at least one embodiment, to which the above options and example apply as well, a hydraulic drive system configured to execute a sequence of operations includes: a motor; a pump coupled to the motor; hydraulic fluid driven by the pump upon activation thereof; a reservoir for the hydraulic fluid, the reservoir in fluid communication with the pump; a chamber in fluid communication with the hydraulic fluid upon activation of the pump; a ram movably positioned at least partially in the chamber according to the hydraulic fluid and pressure thereof; a primary trigger configured to cause, upon actuation thereof, activation of the motor thereby causing: the pump to move hydraulic fluid from the reservoir into the chamber thereby extending the ram; a control system; and at least one sensor in communication the control system. When the primary trigger is user actuated and the ram is extended, the pump continues to pump fluid, under at least partial control by the control system, until a threshold condition is determined by the control system using the at least one sensor.

The above summary is to be understood as cumulative and inclusive. The above described embodiments and features are combined in various combinations in whole or in part in one or more other embodiments.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

Figure 1A:
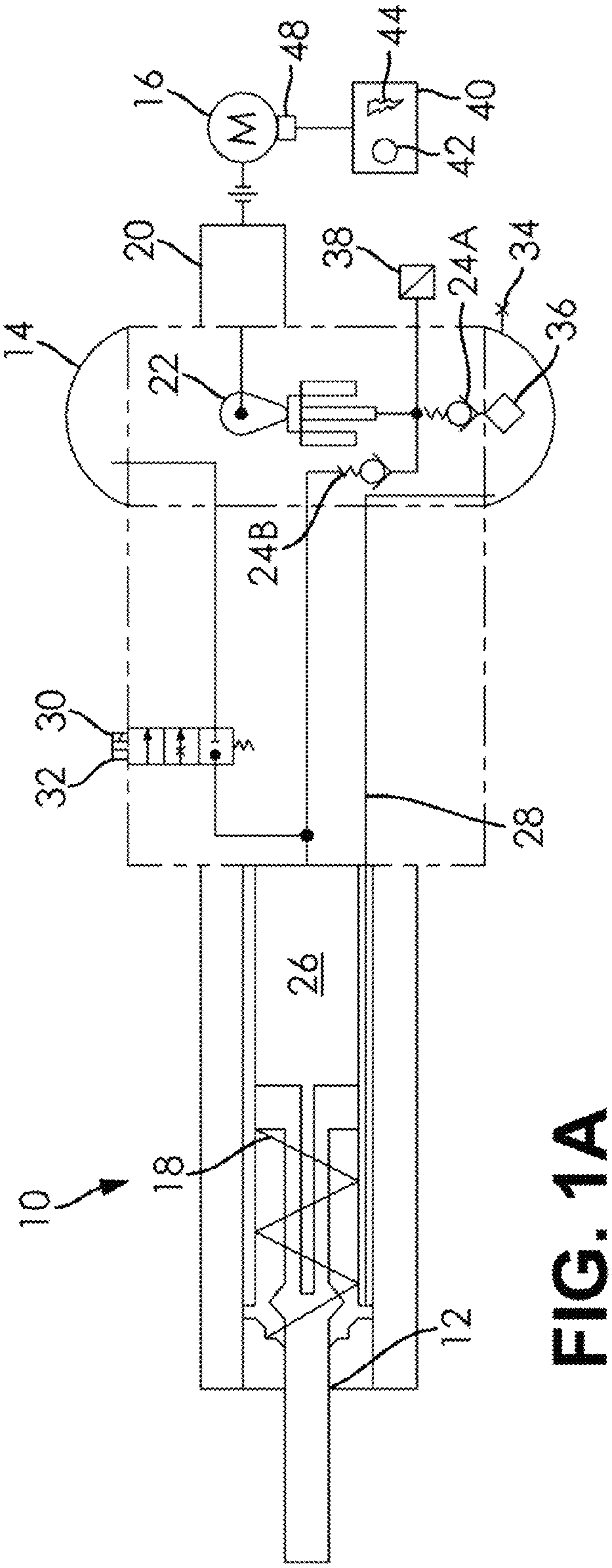
FIG. 1A is a block diagram of a tool, and a hydraulic drive system thereof, according to at least one embodiment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a," "an," and "the" refer to "one or more" when used in the subject specification, including the claims. Unless indicated to the contrary, the numerical parameters set forth in the instant specification and attached claims are approximations that can vary depending upon the desired properties sought to be obtained within the scope of these descriptions.

The drawings illustrate novel and advantageous features of at least one hydraulic tool and hydraulic system therefore, according to embodiment of one or more invention. More accurate determination of hydraulic state based on the status of hydraulic fluid and friction elements of the tool are provided. More accurate estimation of tool and cut crimp state or condition can be determined based on tool variables that may not get reflected in current, but are present in a combination of temperature, pressure and current. A smarter tool is provided which is reacting to and utilizing a plurality of (i.e., at least two) real time variables including but not limited to: Temperature, pressure, voltage, current, time, viscosity and energy.

The estimation of tool status i.e. determining the progress, state or success of a cut crimp operation is made more accurate by utilizing the real time conditions of the measured variables to determine key event parameters, i.e. cut crimp status, cut crimp, competition and tool limits such as retract point during normal and non-ideal cut crimp conditions.

Other innovative features of hydraulic tools and hydraulic systems therefor according to embodiments within these descriptions and drawings include:

- Estimation of Viscosity of the hydraulic fluid (viscosity range)
- Cold temperature version of the tool with, hydraulic fluid choice at purchase time
- If the tool is cold, knowing the temperature outside, circulate fluid to heat it up
- The tool has the ability to activate the bypass, and have a heat up state activated by the user
- Soft start low-pressure bypass to heat up fluid, a soft start mode
- Expended energy, or integral of pressure
- Pressure event sensing possibly combined with current sensing FIG. 1 is a diagram of a bypass solenoid interface and circuit details, according to at least one embodiment. An electrically determined retract feature is provided. A solenoid activated retract feature and a manual retract feature are both provided. Pressures for tools including 6T and 15T tools as non-limiting examples are accommodated. Temperature ranges of operation, and how tool compensates are included features.

In summary, a non-limiting set of features, some of which may be optional, include:

Number of Pistons: 1
Drive: Cam driven by electric motor
Inlet Check Valve: Yes (Quantity 1)
Outlet Check Valve: Yes (Quantity 1)
Tonnage Control: Electronic
Manual Release: Yes
In-line Construction
Time Between Motor Cessation and Solenoid operated release: <1 second
Maximum Pressure: 10,000 psi
Ram Tonnage: 3 US Tons
Extend Time: 2-3 seconds
Retract Time: 2-3 seconds These descriptions refer to a hydraulic drive system, and components thereof, defining, in at least one embodiment, a hydraulic tool as illustrated in FIG. 1. By movement of the ram 12, the jaw or jaws of a cutting and/or crimping tool, or other moving component(s) of another tool type, are moved in at least embodiment, such that the referenced item 10 can be termed a hydraulic drive system and a hydraulic tool. The ram 12 in the illustrated embodiment is single acting with a spring return. The strength of the return spring 18 shall be sufficient to return the ram and push the hydraulic fluid back to the reservoir 14, which may be a bladder type. The design will have leakage drain paths for all single acting rams, cylinders, and pistons for smooth operation. A ram leakage drain 28 is shown in FIG. 1A. The design may be in-line, with reference to the motor 16, gearbox 20, and pump piston actuator 22 having common drive shaft as non-limiting example. In at least one example, the motor 16 is electric, and the actuator 22 is a cam driven single piston pump type. For example, a single piston design may be used with one inlet check valve 24A and one outlet check valve 24B for simplicity of the pumping mechanism. The retract function cam achieved by one solenoid actuated valve 30 that has the option of operation by a control system 40 or by use of manually operated secondary trigger 32, such as a push button acting as a switch or other depressible electronic release in operation. The valve 30 can be a plunger style valve with check balls due to pressure. The describes a sequence of operations, according to at least embodiment, which can be advantageously used for many particular hydraulic tool types, including crimping and cutting tools and other. A fill port 34 and a suction strainer 26 are provided for system maintenance.

A controller 40, termed also as a control system herein, is represented in FIG. 1A as including at least one primary trigger 42, such as a button acting as a switch, and a power source 44, which can be, in non-limiting examples, a battery and port or cord for connection to an external power supply.

Depress primary trigger 42: Electric motor 16 turns causing the pump 22 to move hydraulic fluid from the reservoir 14 into the ram chamber 26. This extends the ram 12. Once the ram is fully extended or the tool 10 is clamped around a work piece, the pump 22 continues to pump fluid until a threshold condition is determined by the control system, wherein said threshold condition may rely at least in part on a pressure, temperature, voltage, current, time, viscosity, and/or energy.

Once the threshold condition is determined by the control system, the control system turns off the electric motor 16 and subsequently makes a separate determination as to how quickly to actuate the solenoid actuated valve 30. The length of time between the cessation of the motor 16 and the activation of the solenoid actuated 30 is determined by the control system and may be based on one or more variables including the length of the cut/crimp operation, temperature, pressure, viscosity, current, time, and/or energy.

The solenoid actuated valve 30 is actuated open, which decompresses the ram chamber 26 and vents the fluid back to reservoir 14. The return spring 18 on the ram pushes the fluid through the valve 30 back to tank.

Once a low-pressure condition is reached according to a sensor 38, for example a pressure transducer, a signal is sent to turn off the solenoid of the valve 30. The solenoid valve returns to its de-energized state (closed).

Upon a user operating the secondary trigger 32, for example by depress an electronic release button serving as the secondary trigger: This will energize the solenoid actuated valve 30 to open, which will vent the fluid in the ram chamber 26 back to reservoir 14. The ram 12 will retract by force of the return spring.

If the extend button/trigger (primary trigger 42) is released mid stroke, the ram 12 will stop and hold position.

Depress Manual Release Button/Trigger (secondary trigger 32): This will manually open the solenoid actuated 30 return valve, which will vent the fluid in the ram chamber 26 back to reservoir 14. The ram will retract by force of the return spring.

A mechanical safety relief valve may be included. A current sensor 48 may be used on the electric motor as a safety backup. This will mitigate the chance of over pressurization due to a bad pressure transducer/switch signal from sensor 38. If over current is sensed, the tool should stop operating and be serviced.

Figure 1B:
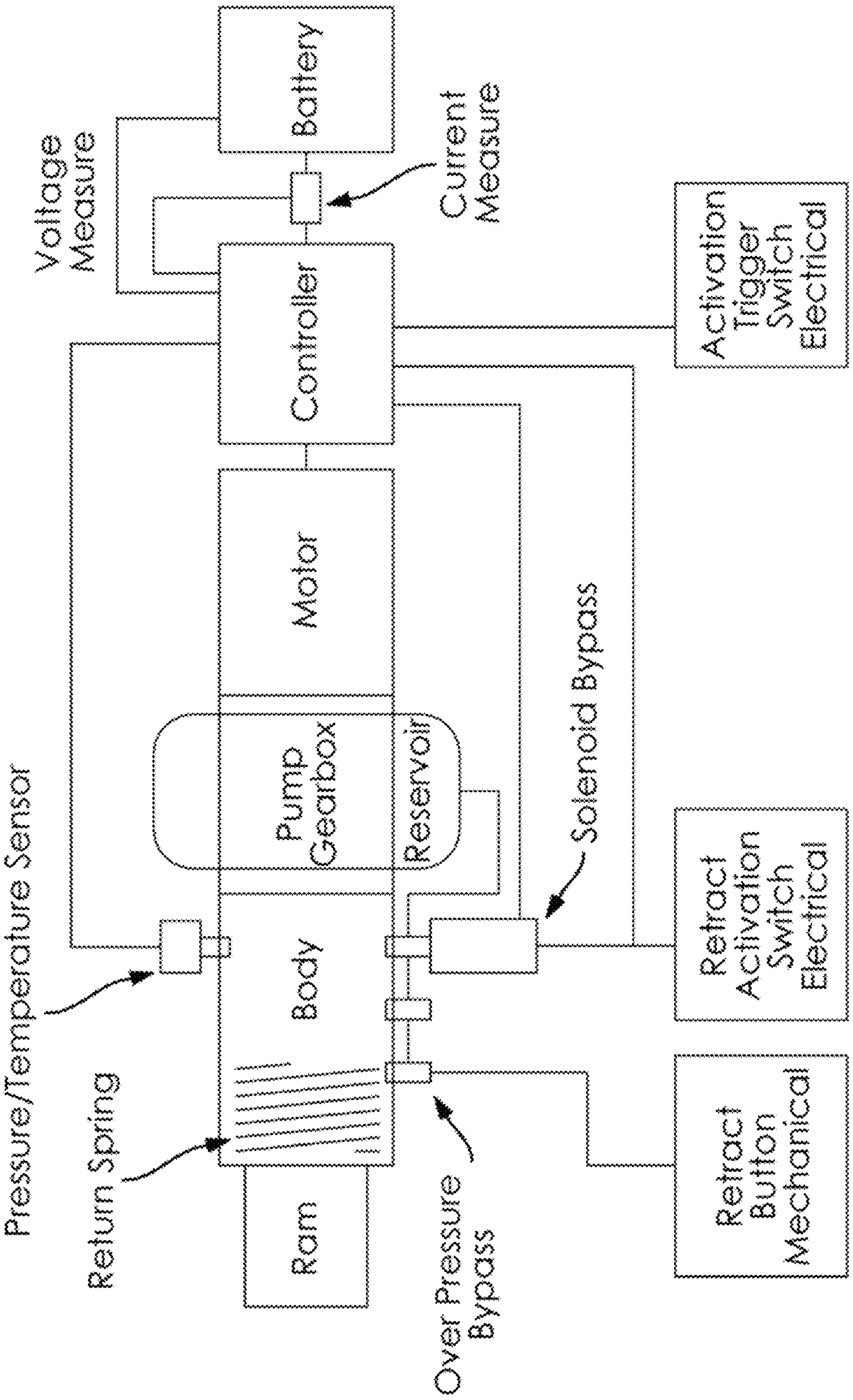
FIG. 1B is a block diagram of a tool and the drive system thereof, according to at least one embodiment.

FIG. 1B is an alternative diagram to which at least some of the above descriptions apply as well.

Figure 2:
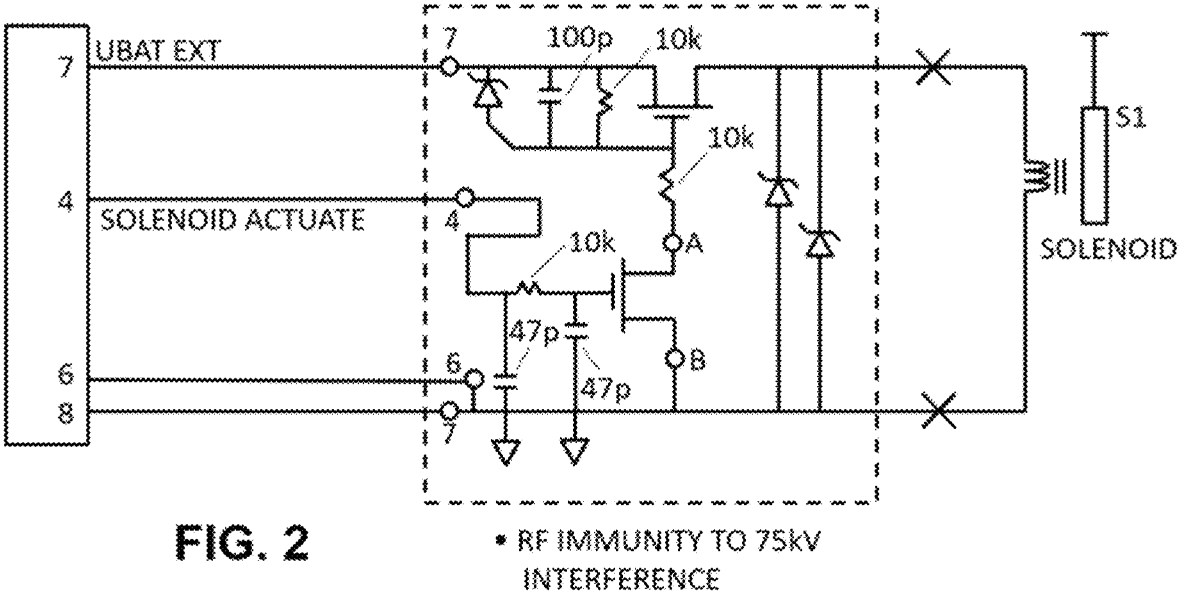
FIG. 2 is a diagram of a control circuit detail for a hydraulic tool, according to at least one embodiment.
Figure 3:
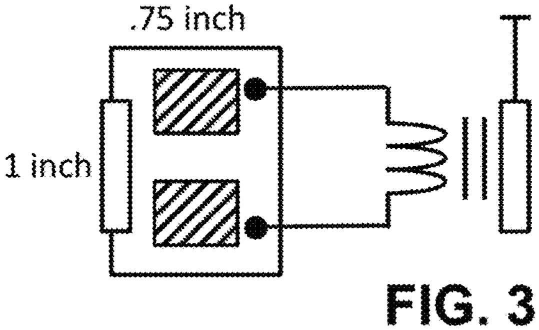
FIG. 3 is a diagram of the solenoid interface portion of a control circuit, according to at least one embodiment.

FIGS. 2 and 3 are diagrams of a bypass solenoid interface and circuit details. Numerical values give are provided as non-limiting examples, which taken together represent at least one advantageous embodiment. Capacitance for capacitors is shown in farads, such that "p" represent picofarads for such examples. Resistance for resistors is shown in ohms, such that "k" represents kilo-ohms in such examples.

Figure 4:
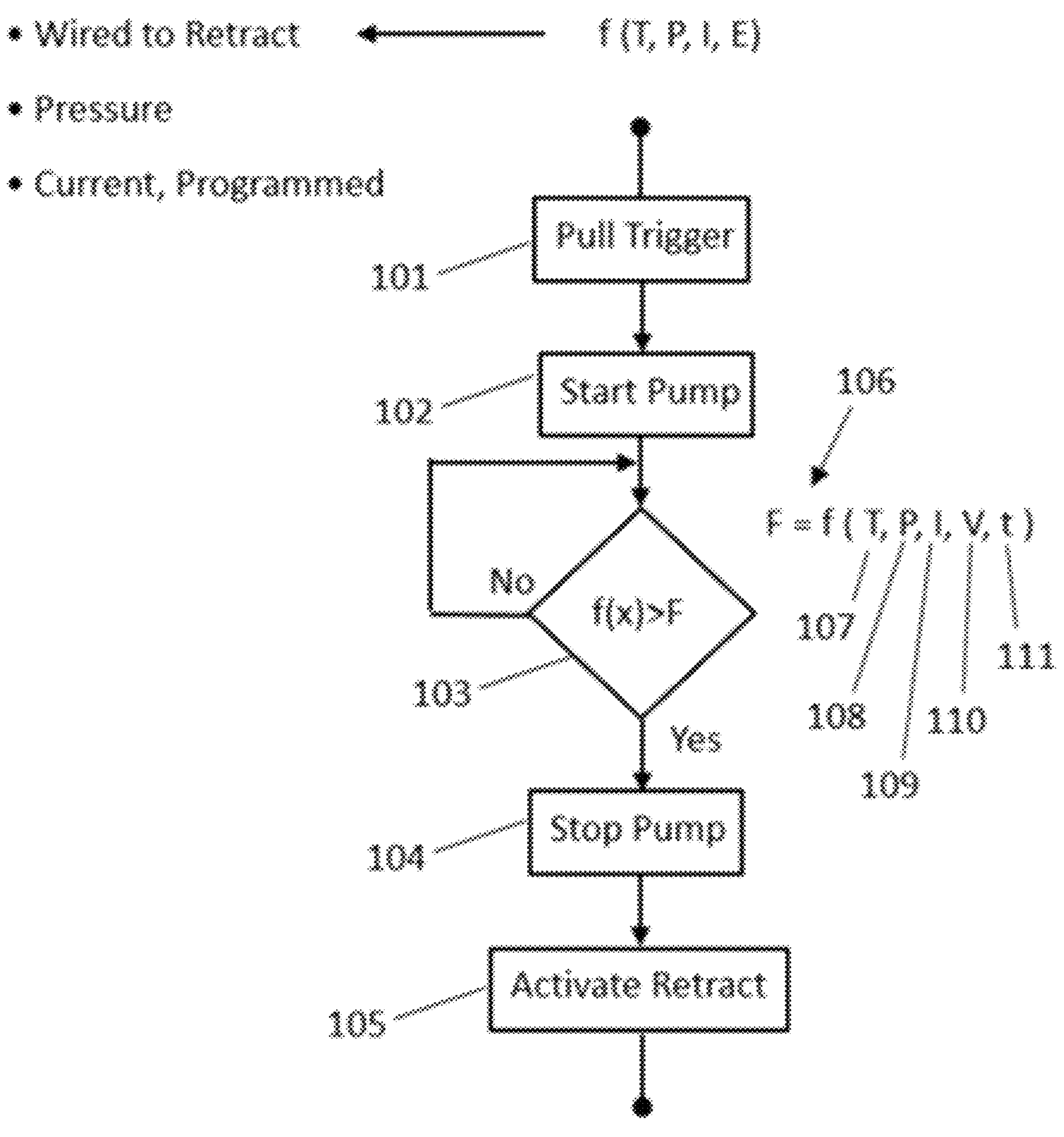
FIG. 4 is a flowchart representing an exemplary method of tool operation, according to at least one embodiment.

FIG. 4 is a flowchart representing an exemplary method of tool operation, according to at least one embodiment, in which, as step 101, a user pulls the trigger of a tool. This prompts step 102, in which the hydraulic system pump of the tool is started. Step 103, with the pump activated and applying pressure to a workload or work piece in use of the tool, includes determining whether a calculated value of a function "f," referenced as function 106, exceeds a threshold value "F." The function 106 is calculated using real time system variables including temperature 107 (T), pressure 108 (P), current 109 (I), viscosity 110 (V), and time 111 (*t*). If the calculated value of the function 106 fails to exceed the threshold F, resulting tentatively as no (N) in step 103, the method returns to step 103 and the calculation is repeated, for example periodically or conditionally. Thus step 103 represents a feedback loop in which the pump remains with the pump activated and applying pressure to a work load or work piece in use of the tool. The lingering of the method at step 103 may, for example, the advance of a tool part toward a work piece, and the tool part on the work piece, within safe parameters and limits.

In any iteration of the step 103 in which the calculated value of the function 106 exceeds the threshold F, resulting as yes (Y) in step 103, the method advances toward step 104, in which the pump is stopped. The advance of the method beyond step 103 may represent, for example, the completion of the task of a tool part upon a work piece, such as crimping, severing, or otherwise setting a desired effect upon the work piece. However, the advance of the method from step 103 to step 104 may represent a tool piece reaching its end of stroke, over pressuring of the hydraulic system of the tool, a threshold temperature being reached or exceeded, or any other condition at which the calculated value of the function 106 exceeds the threshold value F. This is expressed as, in Equation 1:

$$f(T, P, I, V, t) > F \qquad \text{(Equation 1)}$$

The method proceeds from step 104 to step 105, which includes activating retraction.

Figure 5:
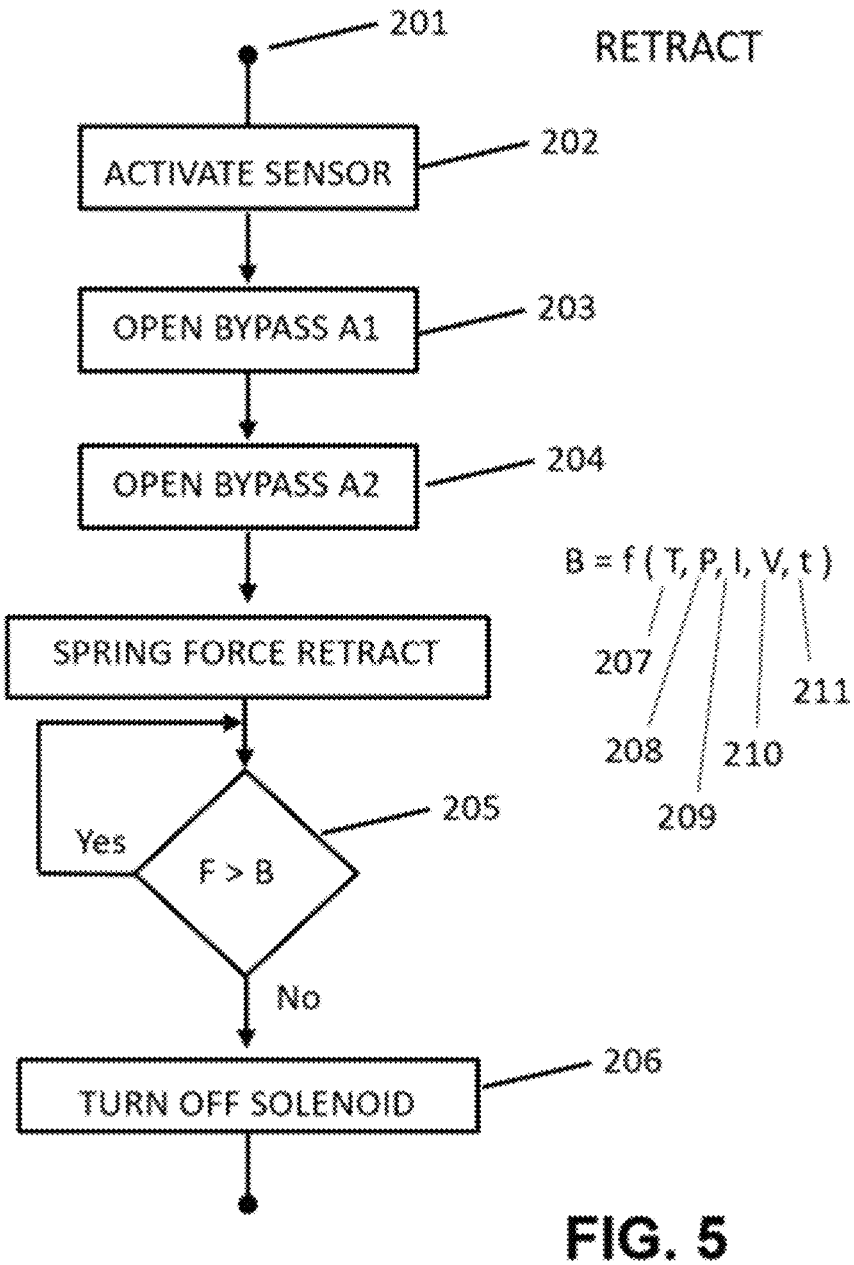
FIG. 5 is a flowchart representing an exemplary method of retraction with regard to, for example, resetting a hydraulic tool and hydraulic system therefor.

FIG. 5 is a flowchart representing an exemplary method of retraction with regard to, for example, resetting a hydraulic tool and hydraulic system therefor. The method begins at step 201, at which the task of a tool part upon a work piece, such as crimping, severing, or otherwise setting a desired effect upon the work piece, is complete or a reset is needed for other reasons such as the condition of Equation 1 is reached for example with reference to steps 103 and 104 of the method of FIG. 4. The method of FIG. 5 proceeds from step 201 to step 202, at which a solenoid is activated, and the method proceeds to step 203, in which a first bypass (A1) is opened. The method then proceeds to step 204, in which a second bypass (A2) is opened. Following step 204, and preceding the subsequent step 205, a forced retraction occurs.

Step 205, with a force for retracting maintained, includes determining whether a calculated value of a function "f" is above a threshold value "B." The function f of FIG. 5 is calculated using real time system variables including temperature 207 (T), pressure 208 (P), current 209 (I), viscosity 210 (V), and time 211 ($t$). If the calculated value of the function f exceeds the threshold B resulting tentatively as yes (Y) in step 205, the method returns to step 205, in iterative sense, and the calculation is repeated, for example periodically or conditionally. Thus step 205 represents a feedback loop in which a force for retracting is maintained. The lingering of the method at step 205 may, for example, withdraw a tool part from a work piece and advances the tool overall toward a reset for next use.

In any iteration of the step 205 in which the calculated value of the function fails to exceed the threshold B, resulting as no (N) in step 205, the method advances toward step 206, in which the solenoid is stopped. The advance of the method beyond step 205 may represent, for example, the completion of a tool reset in preparation for storage or next use. However, the advance of the method from step 205 to step 206 may represent a tool malfunction, a need for service, or any other condition at which the calculated value of the function f fails to exceed the threshold B. Calculation of the threshold B is expressed as in Equation 2:

$$B = f(T, P, I, V, t) \qquad \text{(Equation 2)}$$

Figure 6:
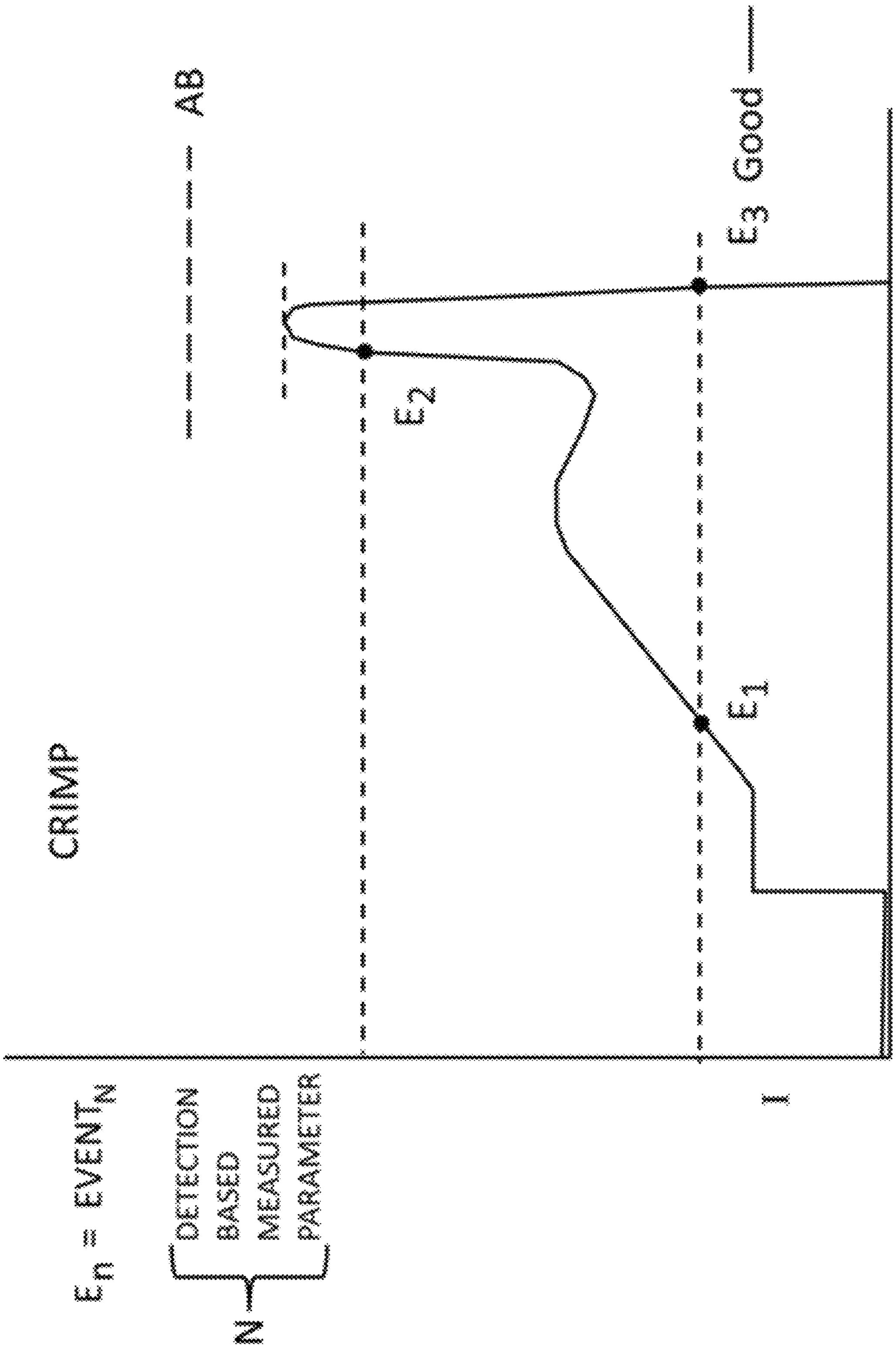
FIG. 6 is a graph of current (I) in a crimping operation of a hydraulic tool on a work piece.

FIG. 6 is a graph of current (I) in a crimping operation of a hydraulic tool on a work piece.

Figure 7A:
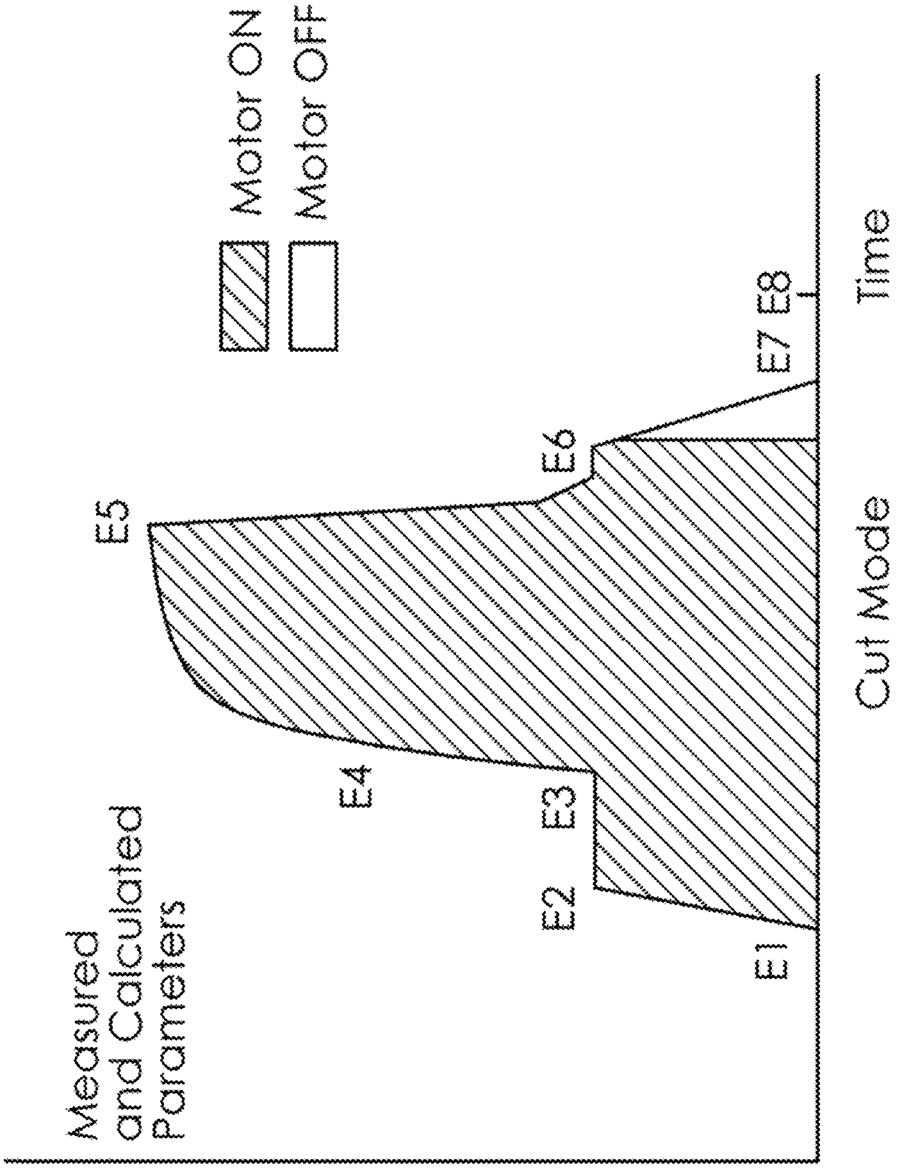
FIG. 7A is a graph of measured and calculated parameters versus time for cut mode operation, representing at least pressure versus time in at least one example.
Figure 7B:
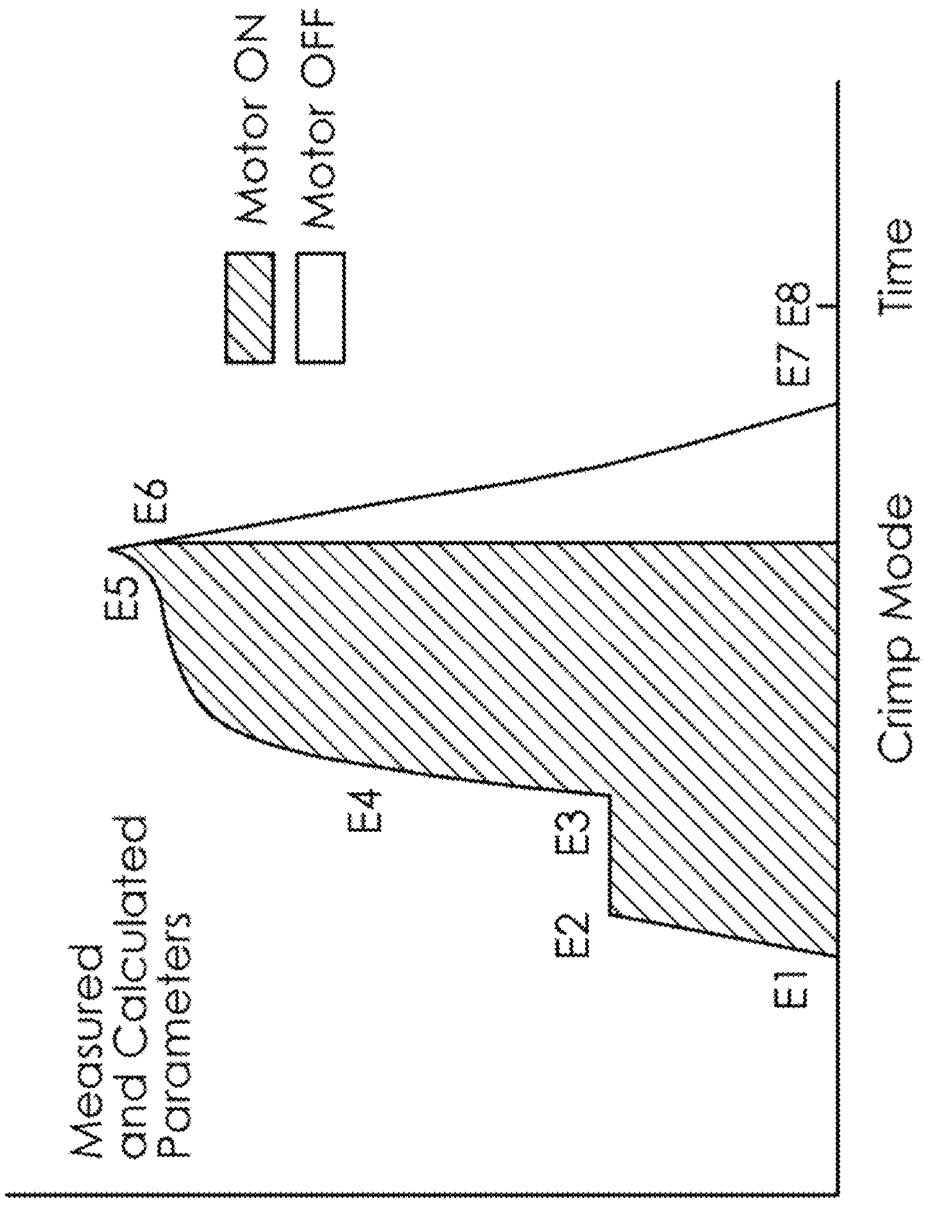
FIG. 7B is a graph of measured and calculated parameters versus time for crimp mode operation, representing at least pressure versus time in at least one example.

FIG. 7A is a graph of measured and calculated parameters versus time for cut mode operation. FIG. 7B is a graph of measured and calculated parameters versus time for crimp mode operation. Events represented as E1-E8 in FIGS. 7A and 7B are detailed in the following description of operation, which is to be taken also in view of at least FIG. 1B for reference to mechanical and electrical features.

Overview—The system using the algorithm that uses pressure, current, temperature and voltage can detect specific events and take actions on those events. Additionally, the tool can determine what action to take based on parameters measured during the cycle to affect the outcome of the process. The tool can also determine if the process is successful, unsuccessful or may need to be visually verified.

E1, Event 1: a. Motor Activated, without load; b. Hydraulic pressure begins to build by means of cam driven piston pump; c. As the hydraulic pressure builds in the body the ram begins to move closing the jaws; d. Hydraulic pressure builds until E2, Event 2.

E2, Event 2: a. Detection that the pressure is building, and the ram is moving.

E3, Event 3: a. Detection of the increasing pressure as the jaws contact the crimp housing or wire and start to compress or cut.

E4, Event 4: a. Hydraulic pressure continues to ramp up; b. Characteristics of the measurement function allow the determination of what action is being performed, crimp, cut, and the identification of characteristics of the materials, wire size type etc.

E5, Event 5 (CRIMP Mode, FIG. 7B): a. Is detected based on the relationship of current, temperature and a rapid increase in pressure.

E5, Event 5 (CUT Mode, FIG. 7A): a. Is detected based on the relationship of current, temperature and a rapid decrease in pressure; b. The motor continues to run in order to complete the cut, allowing the blades to clear any insulation or wrapping materials.

E6, Event 6: a. The motor is turned off; b. The solenoid is activated; c. The ram is retracted by the spring force.

E7, Event 7: a. The tool ram has fully retracted.

E8, Event 8: a. The solenoid is deactivated, stopping the retract and allowing the next cycle to start.

The system, in at least one embodiment, includes manual and electrical methods for a system hydraulic release. The release addresses incomplete crimps and cuts. The manual release will be described as E9, Event 9. See FIG. 1B for reference to mechanical and electrical features.

E9, Event 9, Mechanical Method: a. User releases the activation trigger switch; b. User depresses mechanical retract button; c. Mechanical release valve Activates.

E9, Event 9, Electrical Method: a. User releases the activation trigger switch; b. User depresses retract activation switch; b. Tool turns off motor if its running; c. Tool activates solenoid; d. Spring force retracts ram.

Figure 8:
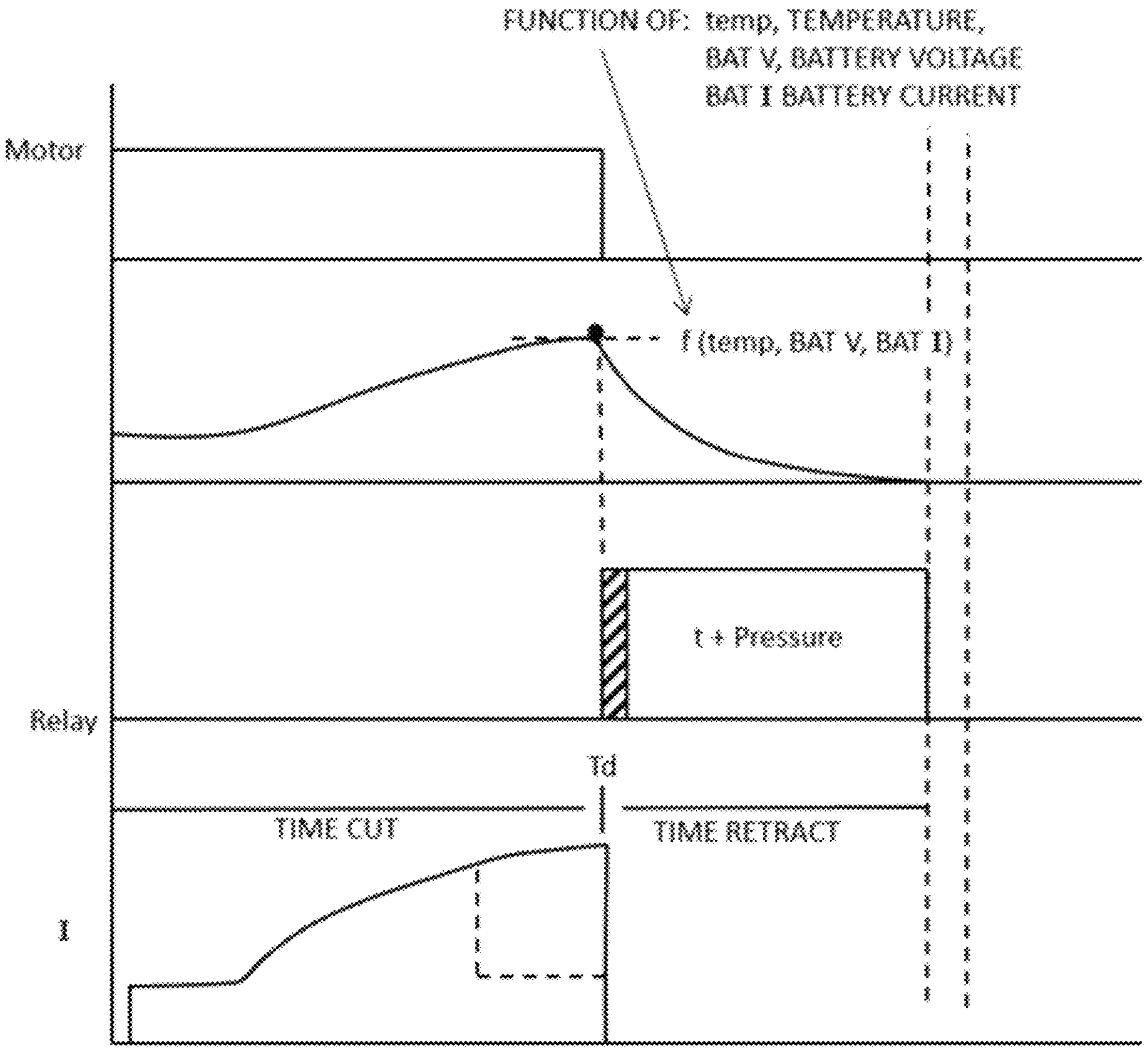
FIG. 8 includes a graph of each of Motor activation, Relay status, and current (I) along a common time duration.

FIG. 8 includes a graph of each of Motor activation, Relay status, and current (I) along a common time duration.

Figure 9:
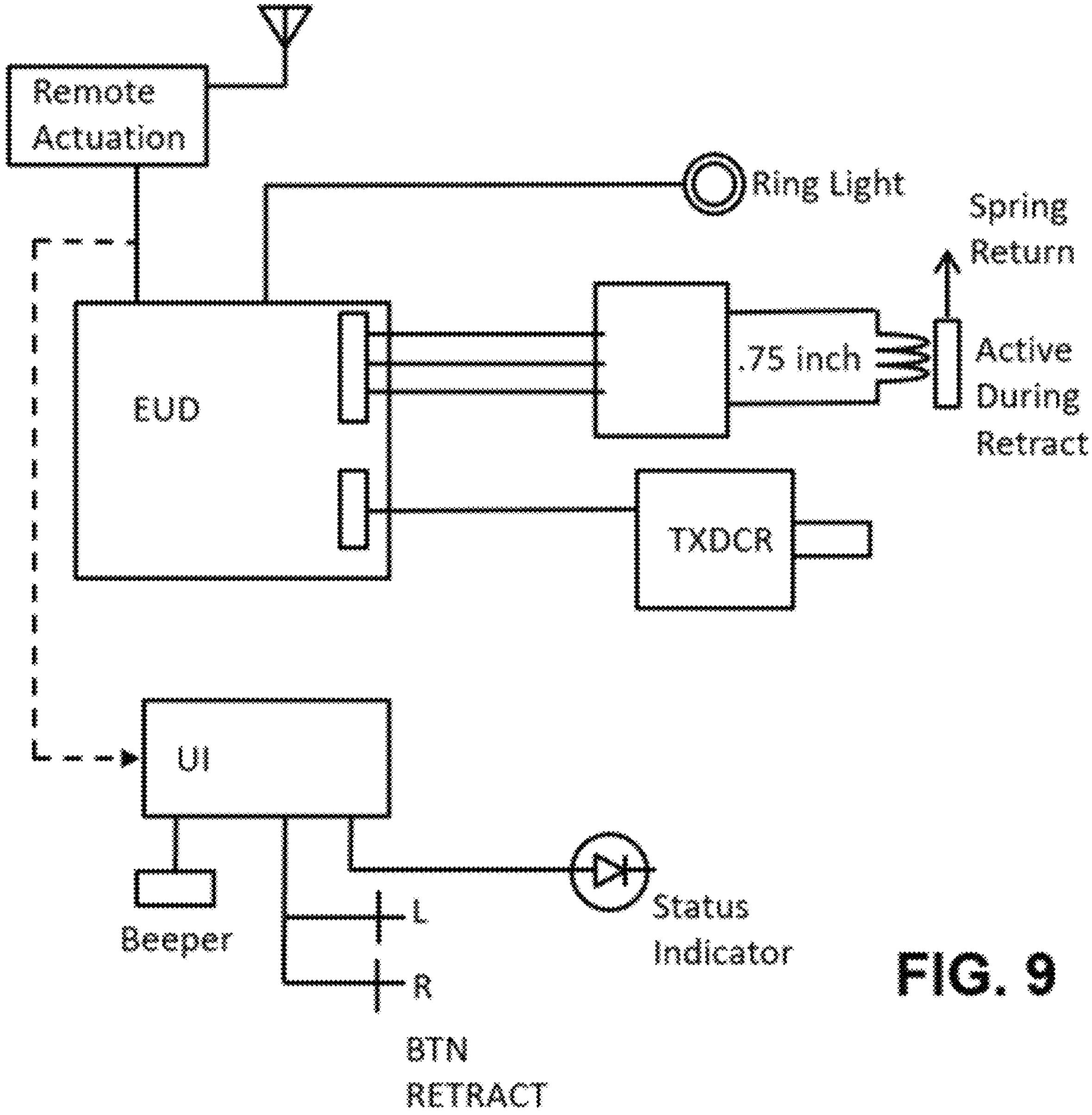
FIG. 9 is a diagram an electrical circuit according to at least one embodiment.

FIG. 9 is a diagram an electrical circuit according to at least one embodiment.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. A hydraulic tool configured to execute a sequence of operations, the tool comprising:

an electric motor;

a pump coupled to the motor;

hydraulic fluid driven by the pump upon activation thereof;

a reservoir for the hydraulic fluid, the reservoir in fluid communication with the pump;

a chamber in fluid communication with the hydraulic fluid upon activation of the pump;

a ram movably positioned at least partially in the chamber according to the hydraulic fluid and pressure thereof;

a primary trigger configured to cause, upon actuation thereof, activation of the motor thereby causing: the pump to move hydraulic fluid from the reservoir into the chamber thereby extending the ram;

a control system; and at least one sensor in communication the control system, wherein, when the primary trigger is user actuated and the ram is fully extended or the tool is clamped around a work piece, the pump continues to pump fluid, under at least partial control by the control system, until a threshold condition is determined by the control system using the at least one sensor, and wherein the control system is configured to override user action on the primary trigger in the event of the threshold condition being determined by the control system.

2. The hydraulic tool of claim 1, wherein the sensor comprises at least one of a pressure transducer and a switch.

3. The hydraulic tool of claim 1, further comprising a pressure transducer that sends a signal to the control system indicating a certain pressure has been reached, which, in combination with at least one other variable, then causes the control system to turn off the electric motor.

4. The hydraulic tool of claim 3, further comprising a solenoid actuated valve in fluid communication with the chamber, wherein, the solenoid actuated valve opens upon being activated, and the chamber decompresses as the hydraulic fluid flows from the chamber to the reservoir.

5. The hydraulic tool of claim 4, further comprising a return spring coupled to the ram, the return spring acting to retract the ram thereby forcing the reservoir fluid through the open solenoid actuated valve back to reservoir.

6. The hydraulic tool of claim 5, wherein, the solenoid actuated valve closes upon being deactivated, and once a low-pressure signal is reached, a signal is sent to deactivate the solenoid actuated valve.

7. The hydraulic tool of claim 6, further comprising a secondary trigger by which the solenoid actuated valve is activated to open, which vents the hydraulic fluid in the ram chamber back to the reservoir such that the ram retracts.

8. The hydraulic tool of claim 7, wherein the secondary trigger comprises a depressible electronic release.

9. The hydraulic tool of claim 7, wherein when the primary trigger is released before the ram is fully extended, the ram will stop and hold position.

10. The hydraulic tool of claim 9, further comprising a manual release trigger by which manually opens a return valve, thereby venting the hydraulic fluid in the chamber back to the reservoir such that the ram retracts.

11. A hydraulic drive system configured to execute a sequence of operations, the tool comprising:

a motor;

a pump coupled to the motor;

hydraulic fluid driven by the pump upon activation thereof;

a reservoir for the hydraulic fluid, the reservoir in fluid communication with the pump;

a chamber in fluid communication with the hydraulic fluid upon activation of the pump;

a ram movably positioned at least partially in the chamber according to the hydraulic fluid and pressure thereof;

a primary trigger configured to cause, upon actuation thereof, activation of the motor thereby causing: the pump to move hydraulic fluid from the reservoir into the chamber thereby extending the ram;

a control system; and at least one sensor in communication the control system, wherein, when the primary trigger is user actuated and the ram is extended, the pump continues to pump fluid, under at least partial control by the control system, until a threshold condition is determined by the control system using the at least one sensor, and wherein the control system is configured to override user action on the primary trigger in the event of the threshold condition being determined by the control system.

12. The hydraulic drive system of claim 11, wherein the sensor comprises at least one of a pressure transducer and a switch.

13. The hydraulic drive system of claim 11, further comprising a pressure transducer that sends a signal to the control system indicating a certain pressure has been reached, which, in combination with at least one other variable, then causes the control system to turn off the motor.

14. The hydraulic drive system of claim 13, further comprising a solenoid actuated valve in fluid communication with the chamber, wherein, the solenoid actuated valve opens upon being activated, and the chamber decompresses as the hydraulic fluid flows from the chamber to the reservoir.

15. The hydraulic drive system of claim 14, further comprising a return spring coupled to the ram, the return spring acting to retract the ram thereby forcing the reservoir fluid through the open solenoid actuated valve back to reservoir.

16. The hydraulic drive system of claim 15, wherein, the solenoid actuated valve closes upon being deactivated, and once a low-pressure signal is reached, a signal is sent to deactivate the solenoid actuated valve.

17. The hydraulic drive system of claim 16, further comprising a secondary trigger by which the solenoid actuated valve is activated to open, which vents the hydraulic fluid in the ram chamber back to the reservoir such that the ram retracts.

18. The hydraulic drive system of claim 17, wherein the secondary trigger comprises a depressible electronic release.

19. The hydraulic drive system of claim 17, wherein when the primary trigger is released before the ram is fully extended, the ram will stop and hold position.

20. The hydraulic drive system of claim 19, further comprising a manual release trigger by which manually opens a return valve, thereby venting the hydraulic fluid in the chamber back to the reservoir such that the ram retracts.

21. A hydraulic drive system configured to execute a sequence of operations, the tool comprising:

a motor;

a pump coupled to the motor;

hydraulic fluid driven by the pump upon activation thereof;

a reservoir for the hydraulic fluid, the reservoir in fluid communication with the pump;

a chamber in fluid communication with the hydraulic fluid upon activation of the pump;

a ram movably positioned at least partially in the chamber according to the hydraulic fluid and pressure thereof;

a primary trigger configured to cause, upon actuation thereof, activation of the motor thereby causing: the pump to move hydraulic fluid from the reservoir into the chamber thereby extending the ram;

a control system;

a pressure transducer that sends a signal to the control system indicating a certain pressure has been reached, which, in combination with at least one other variable, then causes the control system to turn off the motor;

a solenoid actuated valve in fluid communication with the chamber, wherein, the solenoid actuated valve opens upon being activated, and the chamber decompresses as the hydraulic fluid flows from the chamber to the reservoir; and at least one sensor in communication the control system, wherein, when the primary trigger is user actuated and the ram is extended, the pump continues to pump fluid, under at least partial control by the control system, until a threshold condition is determined by the control system using the at least one sensor.

* * * * *